(12) United States Patent
Mills

(10) Patent No.: US 6,198,823 B1
(45) Date of Patent: Mar. 6, 2001

(54) METHOD FOR IMPROVED AUTHENTICATION FOR CELLULAR PHONE TRANSMISSIONS

(75) Inventor: Kevin M. Mills, Austin, TX (US)

(73) Assignee: DSC Telecom, L.P., Plano, TX (US)

( * ) Notice: Subject to any disclaimer, the term of this patent is extended or adjusted under 35 U.S.C. 154(b) by 0 days.

(21) Appl. No.: 09/047,040

(22) Filed: Mar. 24, 1998

(51) Int. Cl.$^7$ ................................. H04L 9/32; H04Q 7/22
(52) U.S. Cl. ............................................. 380/247; 455/411
(58) Field of Search ....................... 380/23, 49, 247–249; 455/411, 410

(56) References Cited

U.S. PATENT DOCUMENTS

| | | |
|---|---|---|
| 5,123,047 | 6/1992 | Rosenow . |
| 5,237,612 * | 8/1993 | Raith ...................................... 380/23 |
| 5,282,250 * | 1/1994 | Dent et al. .............................. 380/23 |
| 5,325,432 | 6/1994 | Gardeck et al. . |
| 5,390,252 * | 2/1995 | Suzuki et al. ........................... 380/23 |
| 5,404,404 | 4/1995 | Novorita . |
| 5,490,201 | 2/1996 | Moberg et al. . |
| 5,499,297 | 3/1996 | Boebert . |
| 5,586,185 | 12/1996 | Shibata et al. . |
| 5,655,004 | 8/1997 | Holbrook . |
| 5,680,457 | 10/1997 | Bestler et al. . |

* cited by examiner

*Primary Examiner*—Gilberto Barron, Jr.
(74) *Attorney, Agent, or Firm*—Kenyon & Kenyon

(57) ABSTRACT

An authentication process is triggered when a subscriber of a GSM-type cellular-phone-network service attempts a call. In this process, an encrypted result, or a "signed response," previously stored in the subscriber's cellular phone, is transmitted to a Mobile Switching Center (MSC), and a Home Location Register (HLR) in the MSC compares the signed response to an encrypted result previously stored at an Authentication Center (AuC). If the signed response matches the stored encrypted result, the call is allowed to proceed; otherwise, access to a telephone network is denied. Proceeding with the call, the AuC generates a random number and derives a new encrypted result by means of a ciphering algorithm, e.g., a CAVE algorithm, using the random number and the subscriber's unique key previously stored in a database at the AuC. The new encrypted result replaces the previously-stored encrypted result, and the MSC transmit the new random number to the cellular phone, which independently derives a new signed response by means of CAVE algorithm using the transmitted random number and the subscriber's unique key stored in a Subscriber Identity Module (SIM) for the cellular phone. The new signed response is then stored in the cellular phone.

18 Claims, 3 Drawing Sheets

METHOD FOR IMPROVED AUTHENTICATION FOR CELLULAR PHONE TRANSMISSIONS

FIELD OF THE INVENTION

The present invention relates generally to a method for providing a cellular-phone with expedited call processing and a more secure calling environment, and the present invention relates more specifically to a method for performing the transmission and calculation of messages/data utilized in an authentication procedure over more than one call so that each call proceeds faster and the decoding of the user's unique key through the scanning of any single call is made substantially impossible.

BACKGROUND INFORMATION

In recent years, the use of cellular phones for both personal and business related communication has become more popular. The obvious appeal of wireless service is the portability of the telephone, with users no longer confined to a particular space or address. However, this portability also poses a dilemma for the cellular telephone system provider, which must determine the identity of the individual making or authorizing the call for billing purposes and decide if the individual is a subscriber i.e., determine whether the individual is entitled to make the call at all.

One common way to "authenticate" callers, i.e., verify that they are who they claim to be, is set forth in FIG. 3. Each subscriber is provided with a unique, secret "key," which is also maintained in a database record kept by the cellular service provider, i.e., at the cellular service provider station. When a user wishes to make a call from a cellular terminal, i.e., when the user's phone goes off the hook, then in Step 202, the cellular-service provider transmits a signal representing a random number to the terminal. In Step 203, the terminal encrypts the random number with the user's unique key and a predetermined algorithm. Then in Step 204, the encrypted result is transmitted back to the cellular-service provider. There, the same random number is encrypted, again with the user's unique key and the same predetermined algorithm. In Step 206 this encrypted result independently calculated by the cellular service provider is compared with that transmitted from the cellular terminal. If the comparison is a match, the caller is "authenticated" and the call is allowed to proceed. Otherwise, authentication fails, and the user is refused access to the cellular network.

Unfortunately, the above described authentication procedure is not entirely satisfactory. It involves extensive calculation at both the user's terminal and the cellular service provider, as well as a number of transmissions between the two. Since a call is not allowed to proceed until the entire authentication is completed, call processing may be significantly delayed.

In addition, it is relatively simple to scan or monitor cellular phone transactions such as the above-described authentication procedure. Therefore, an unauthorized individual can easily obtain the random number and encrypted response transmitted between the terminal and the cellular service provider. In addition, the predetermined algorithm used in encryption will often be well known in the art, e.g., CAVE algorithm. Thus, the only unknown for the unauthorized individual intending to circumvent the authentication security procedure via scanning is the user's unique key, which unfortunately may be decoded once the random number, encrypted result and ciphering algorithm are known. In fact, unauthorized cellular phone use is not unusual, and has significantly increased the industry's cost of doing business.

Therefore, what is needed is an improved authentication procedure which does not unduly delay call processing and at the same time renders unauthorized cellular use less likely.

SUMMARY OF THE INVENTION

It is an object of the present invention to greatly increase the difficulty of stealing and/or decoding of cellular phone encryption keys.

It is another object of the present invention to prevent fraudulent cellular use occurring as a result of interception of transmission of encryption key data.

It is yet another object of the present invention to provide a user-authentication for cellular-phone use, which method distributes transmission and calculation of messages/data utilized in the authentication method over more than one call.

The present invention achieves the above objects by providing an alternative to the conventional authentication procedure. In accordance with the present invention, when a subscriber signs on for service, the subscriber is provided with a unique key and an initial encrypted number. The initial encrypted number may be stored in the subscriber's terminal. The cellular-service provider's Home Location Register also stores the same unique key and initial encrypted number in a database record associated with the subscriber.

Once these preliminary steps are taken, the following improved authentication procedure according to the present invention may be utilized. When the subscriber's terminal goes off hook, i.e., when the user intends to make or receive calls, the encrypted result stored in the terminal is transmitted to the cellular-service-provider station which compares the result to its own stored encrypted result. If the results match, the call is allowed to proceed. If not, the user is rejected access to the cellular network.

During the call, the cellular-service-provider station transmits a random number to the terminal. The terminal and cellular-service-provider station then independently encrypt the random number with the same ciphering algorithm and user's unique key. The encrypted results are then stored at their respective locations at the terminal and cellular-service-provider station, replacing the encrypted results stored earlier. These encrypted results are in turn used the next time access to the cellular network is desired, i.e., the next time the phone goes off hook. Each subsequent time the phone goes off hook, the authentication procedure is again initiated from the terminal with transmission of its previously stored encrypted result for comparison at the cellular-service-provider station.

As should be clear from the above description, the improved authentication procedure according to the present invention allows call processing to proceed more quickly. The call is allowed to proceed immediately, after transmission of an encrypted result from the terminal and a successful comparison of the encrypted result at the cellular-service-provider station. Call processing is not delayed by the transmission of the random number, or by any calculation at the cellular provider station or the terminal, as these take place after access to the cellular network is already allowed.

In addition, the authentication procedure according to the present invention is an improvement on current practice in that the random number and the encrypted result obtained from that random number are not transmitted during the same call. Rather, for each call attempt, the previously stored encrypted result (obtained from the random number transmitted during the preceding call) and a new, unrelated random number (used to obtain a new encrypted result for a future call) are transmitted. Without both the encrypted result and the random number used to obtain it, it is substantially harder to determine the user's unique key. Furthermore, it would be impossible to decode the user's unique key by scanning just one call. Persons using a scanner to obtain information transmitted between the terminal and cellular-service-provider station would have to scan two distinct calls to have any possibility of decoding the user's key. As these calls may be hours or days apart, the possibility of decryption is significantly reduced.

Further objects and advantages of the present invention will become apparent from a review of the detailed description provided below.

DETAILED DESCRIPTION OF THE INVENTION

Figure 1:
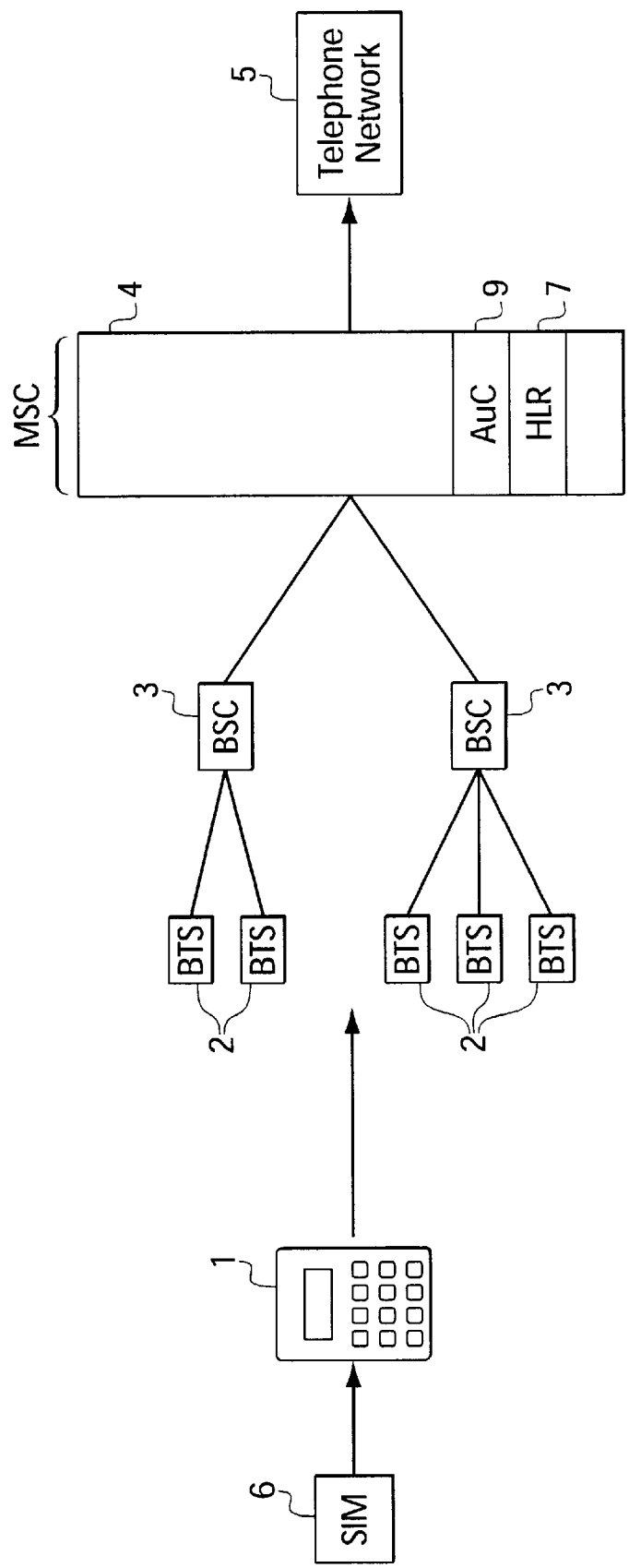
FIG. 1 illustrates the apparatus of a GSM cellular network, which is one possible implementation of the apparatus which utilizes the method of the present invention.

In one possible implementation, the method according to present invention may be used in a Global System for Mobile Communications ("GSM") type cellular network, the primary functional components of which network are shown in FIG. 1. It should be noted that FIG. 1 is by no means intended to describe in detail a GSM cellular network, but rather is a basic overview of certain major functional components sufficient to illustrate the method according to the present invention described herein.

Turning now to FIG. 1, the cellular terminal 1, also referred to as "mobile equipment," is portable, and held by a subscriber. For purposes of the present description, the cellular terminal 1 is assumed to be a cellular phone, but the present invention is of equal benefit to an individual attempting a fax or other transmission. The subscriber also carries a Subscriber Identity Module ("SIM") 6. Stored within the SIM 6 is an authentication key unique to the subscriber. When making a call, the subscriber inserts the SIM 6 into a slot on the cellular terminal 1, so that the cellular terminal 1 may read and transmit the authentication key each time the subscriber wishes to log on to the cellular network.

Cellular transmissions from the cellular terminal 1 are received at a Base Transceiver Station ("BTS") 2, which includes a series of radio transmitters. Each BTS 2 covers a certain range in a discrete area. Accordingly, during a call the subscriber carrying a cellular terminal 1 may move in out of the range of a given BTS 2.

Continuing with FIG. 1, a Base Station Controller ("BSC") 3, which ensures call maintenance, is connected to a group of BTS's 2. Specifically, during a call, the cellular terminal 1 continuously transmits to the BSC 3 the signal strength of each of the group of associated BTS's 2. The BSC 3 can then use these transmissions to determine whether the call should be switched to a new BTS 2, i.e., whether the cellular terminal 1 transmissions should be sent to a new BTS 2.

From the BTS's 2, the cellular terminal 1 transmissions are received at the Mobile Switching Center ("MSC") 4, which routes all incoming and outgoing transmissions to and from fixed-line telephone networks 5 (such as Public Switched Telephone Networks ("PSTN") or Integrated Services Digital Network ("ISDN")) or other cellular networks. From such telephone networks, the call connection is completed.

The MSC 4 shown in FIG. 1 is the heart of the cellular-service-provider's network. The MSC's 4 functions include maintaining all necessary administrative and other subscriber information, such as registration and authentication information and location updates. Thus, the MSC 4 includes a number of databases, including the Home Location Register ("HLR") 7 and associated Authentication Center ("AuC") 9. When access to the cellular network is desired, the HLR 7 generally provides the functionality and information necessary for properly allowing or disallowing access. The AuC 9 also plays a role in this process by providing functionality and information necessary for the HLR 7 to authenticate a particular call. For example, when the HLR 7 receives a log-on request transmitted from the cellular terminal 1, the HLR 7 checks a signed response ("SRES"), which is a portion of the log-on request transmission from the terminal, against an encrypted result generated by the AuC 9 for the subscriber. If the SRES transmitted from the cellular terminal 1 is the same as the encrypted result generated by the AuC 9, the MSC 4 transmits to the cellular terminal 1 a message allowing network access. Otherwise, access to the cellular-phone-network is disallowed.

The steps and operation of the authentication procedure according to the present invention, including the respective role of the HLR 7, AuC 9 and SRES, and advantages resulting from practice of the present invention, will become apparent from the following detailed description.

Figure 2:
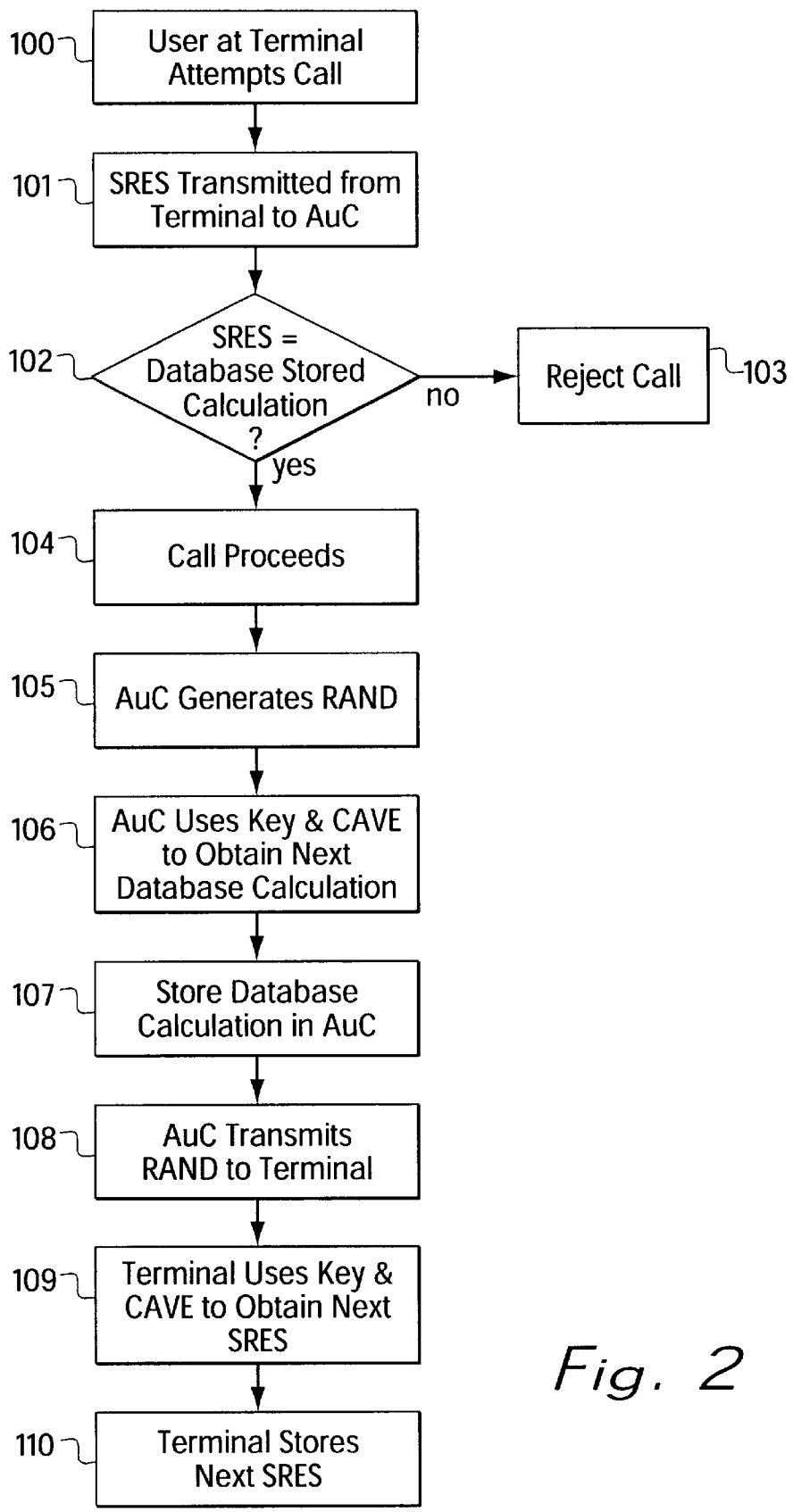
FIG. 2 is a flow chart depicting an authentication procedure and one possible embodiment of the method of the present invention.
Figure 3:
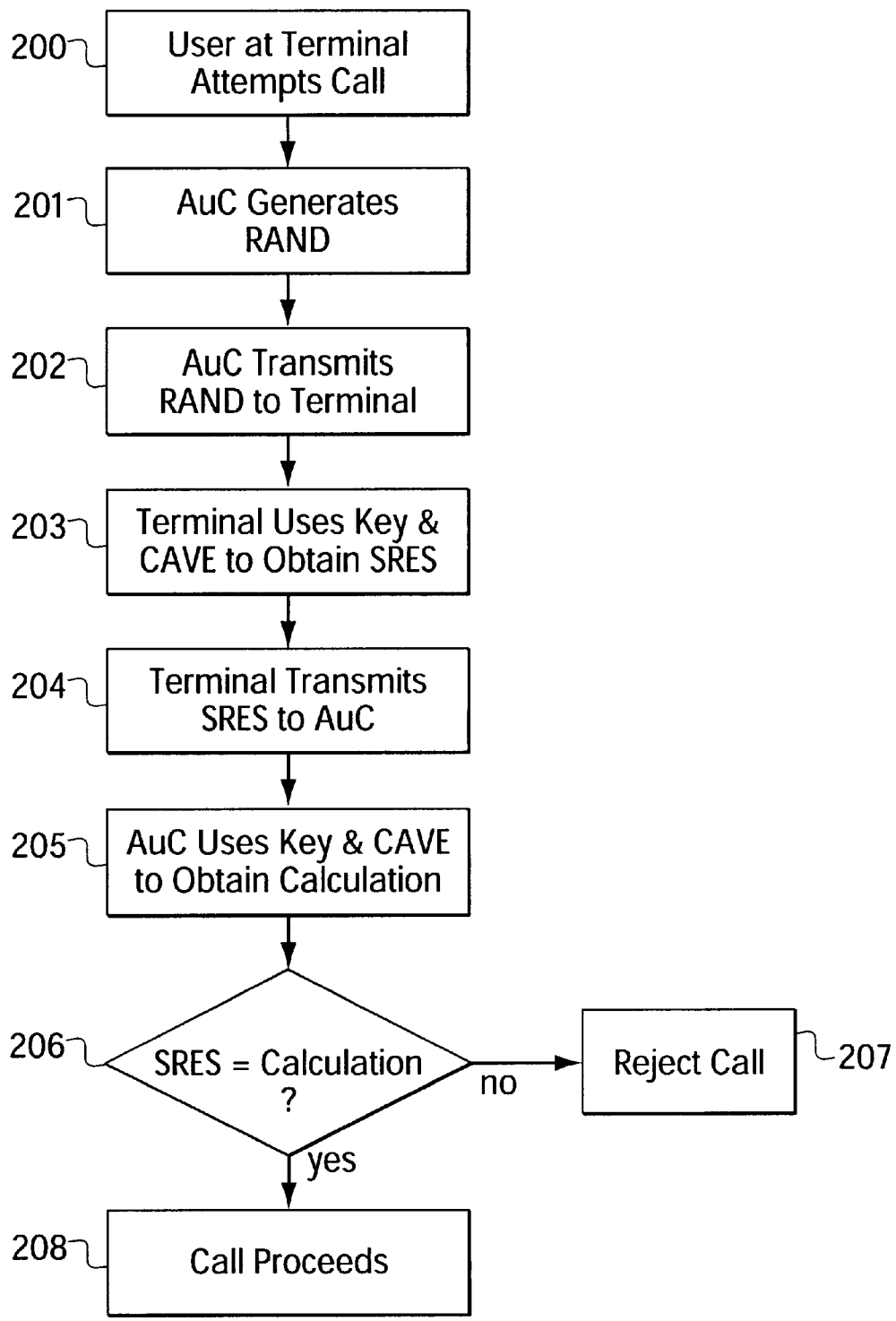
FIG. 3 is a flow chart depicting an authentication procedure in current use and is provided for comparison purposes to illustrate the advantages and benefits the present invention.

Turning now to FIG. 2, a flow chart depicting an authentication procedure which is one possible embodiment of the method of the present invention, the authentication procedure according to the present invention assumes that certain preliminary administrative matters have been completed.

Specifically, when a subscriber signs on for service with the cellular-service-provider, the subscriber receives a cellular terminal 1 as well as an SIM 6 card. As is common practice, an authentication key unique to the subscriber is stored in the SIM 6. In addition, a unique "initial encrypted result," i.e., the above mentioned SRES is also stored in the cellular terminal 1. Both the subscriber's unique key and initial encrypted result are also stored in the AuC 9 of the MSC 4 as part of a database record associated with the subscriber. The subscriber is instructed to carry the SIM 6 with the cellular terminal 1, and to insert the SIM 6 into the cellular terminal 1 whenever the subscriber wishes to make or receive calls.

Once the subscriber signs on for service, the following authentication procedure, illustrated in FIG. 2, may be practiced whenever the subscriber wishes to make or receive calls. In Step 100, the subscriber at a cellular terminal 1 indicates an intent to make a call by taking the phone "off hook," e.g., by pressing a button or flipping a microphone, and inserting the SIM 6 into the cellular terminal 1. As a result, in Step 101, the cellular terminal 1 transmits the "SRES" stored within it to the appropriate BTS 2, and ultimately to the HLR 7. In general, the SRES is the encrypted result (stored in the cellular terminal 1) derived from a random number ("RAND," transmitted from the AuC 9 during a prior call) by manipulation using the subscriber's unique key (stored in the SIM 6) and a ciphering algorithm, such as CAVE. However, as noted above, in the case of the subscriber's first call, the SRES is the initial encrypted result which the cellular service provider causes to be stored in the cellular terminal 1 prior to distribution.

When the SRES is received at the HLR 7, in Step 102, the HLR 7 checks the SRES against an encrypted result stored in a database record associated with the subscriber in the AuC 9. Again, if the subscriber's attempted call is the first request for network access, the encrypted result stored in the AuC 9 for the subscriber will be the same as the SRES stored by the cellular provider in the cellular terminal 1 prior to distribution of the terminal 1 to the subscriber. Otherwise, the encrypted result stored in the AuC 9 is derived from a random number (RAND, transmitted during a prior call to the cellular terminal 1) by manipulation using the subscriber's unique key (also stored in the AuC 9) and the same ciphering algorithm used at the cellular terminal 1, such as CAVE.

If the encrypted result stored in the AuC 9 does not match the SRES transmitted from the cellular terminal 1, then in Step 103 the HLR 7 rejects the request for cellular network access. Otherwise, if the encrypted result stored in the AuC 9 matches the SRES transmitted from the cellular terminal 1, then in Step 104 the call is allowed and a message to that effect is transmitted back to the cellular terminal 1.

Assuming the call is allowed to proceed, the authentication procedure according to the present invention continues and the call is connected. During call processing, in step 105, the AuC 9 generates a new random number (RAND). Then, in step 106, the AuC 9 uses the same ciphering algorithm as the one used by the cellular terminal 1 to independently derive an encrypted result based on (RAND) and the subscriber's unique key stored in the AuC 9. In Step 107, the latest encrypted result of the ciphering algorithm is stored in the subscriber's database record in the AuC 9 for use in connection with a future request for network access, and the existing encrypted result previously stored in the AuC 9 is deleted.

Once finished with its own encryption processing the AuC 9 transmits the (RAND) generated in Step 106 to the cellular terminal 1 in Step 108. In Step 109, like the AuC 9, the cellular terminal 1 then performs the same ciphering algorithm on the (RAND) using the subscriber's unique key stored in the SIM 6. The encrypted result, i.e., the SRES obtained from applying the ciphering algorithm in Step 109 is stored in the terminal in Step 110 for a future network access request, thus replacing the previously stored SRES in the terminal.

Once the call has been completed, and the subscriber makes another network-access request, the above-described authentication process will be repeated, beginning with step 100.

A few points regarding the above embodiment of the present invention are worthy of note. First, call processing continues after transmission of an encrypted result from the cellular terminal 1 and a successful comparison or verification of the encrypted result at the AuC 9. Call processing is not delayed by the transmission of (RAND) or by the processing of a ciphering algorithm at the AuC 9 or the cellular terminal 1.

In addition, the (RAND) and the encrypted result derived from the (RAND) are not transmitted during the same call. Rather, for each call attempt, the previously stored encrypted result, which is derived from the random number transmitted during an earlier call, and a new, unrelated random number, which is used to derive the encrypted result for a future call authentication, are transmitted. Thus, it would be substantially impossible to decode the subscriber's unique key scanning just one call.

Finally, it should be noted that while the present invention has been described in the above specification, in connection with an exemplary embodiment, the present invention is by no means limited thereby. Numerous minor modifications and alterations may be made to the above described embodiment without departing from the scope of the present invention. For example, although the ciphering algorithms used by the cellular terminal 1 and the AuC 9 have been described as being identical, it need not be so: the cellular terminal, and the AuC 9 may use different ciphering algorithms as long as both algorithms produce an identical encrypted result based on the same input. In addition, although the ciphering algorithm used in the present invention has been described as the CAVE algorithm, any other number-manipulating algorithm may be used as the ciphering algorithm.

What is claimed is:

1. As a part of a cellular-phone-call-initiating process, a method for authenticating a caller seeking access to a telephone network via transmission from a cellular terminal through a cellular-phone-service-provider station, each of said cellular terminal and said cellular-phone-service-provider station having a previously stored encrypted result and a unique key assigned to the caller, the method comprising the steps of:

a. transmitting, from said cellular terminal, said previously-stored encrypted result to said cellular-phone-service-provider station;

b. authenticating by comparison whether said encrypted result transmitted from said cellular terminal matches said encrypted result previously stored in said cellular-phone-service-provider station;

c. calculating, at the cellular-phone-service-provider station, a new encrypted result by means of a first ciphering algorithm using a random number and said unique key assigned to the caller;

d. transmitting said random number from said cellular-phone-service-provider station to said cellular terminal; and e. independent of said calculation in step (c), calculating, at the cellular terminal, said new encrypted result by means of a second ciphering algorithm using said transmitted random number and said unique key assigned to the caller;

wherein said new encrypted result calculated in step (c) is stored in said cellular-phone-service-provider station and said new encrypted result calculated in step (e) is stored in said cellular terminal for next authentication attempt.

2. The method according to claim 1, further comprising the step of:

between steps (b) and (c), facilitating access to the telephone network for the caller if said encrypted result transmitted from said cellular terminal matches said encrypted result previously stored in said cellular-phone-service-provider station.

3. The method according to claim 2, wherein said step of facilitating access to the telephone network is performed at said cellular-phone-service-provider station.

4. The method according to claim 3, wherein step (b) is performed at said cellular-phone-service-provider station.

5. The method according to claim 4, wherein said first ciphering algorithm is a CAVE algorithm.

6. The method according to claim 5, wherein said second ciphering algorithm is a CAVE algorithm.

7. The method according to claim 6, wherein said cellular terminal comprises a cellular telephone and said cellular-phone-service-provider station comprises a mobile switching center.

8. The method according to claim 1, wherein step (b) is performed at said cellular-phone-service-provider station.

9. The method according to claim 8, further comprising the step of:
 between steps (b) and (c), facilitating access to the telephone network for the caller if said encrypted result transmitted from said cellular terminal matches said encrypted result previously stored in said cellular-phone-service-provider station.

10. The method according to claim 9, wherein said first and second ciphering algorithms are a CAVE algorithm.

11. A method for authenticating a caller seeking access to a telephone network via transmission from a cellular terminal through a cellular-phone-service-provider station, which method minimizes the amount of transmission and calculation involved in authenticating said caller, each of said cellular terminal and said cellular-phone-service-provider station having a previously stored check message and a unique key assigned to the caller, the method comprising the steps of:
 a. transmitting, from said cellular terminal, said previously-stored check message to, said cellular-phone-service-provider station;
 b. authenticating by comparison whether said check message transmitted from said cellular terminal matches said check message previously stored in said cellular-phone-service-provider station;
 c. facilitating access to the telephone network for the caller if said check message transmitted from said cellular terminal matches said check message previously stored in said cellular-phone-service-provider station;
 d. calculating, at the cellular-phone-service-provider station, a new check message by means of a first ciphering algorithm using a first check element and a second check element;
 e. transmitting said first check element from said cellular-phone-service-provider station to said cellular terminal; and
 f. independent of said calculation in step (d), calculating, at the cellular terminal, said new check message by means of a second ciphering algorithm using said transmitted first check element and said second check element;
 wherein said new check message calculated in step (d) is stored in said cellular-phone-service-provider station and said new check message calculated in step (f) is stored in said cellular terminal for next authentication attempt.

12. The method according to claim 11, wherein said first check element comprises a random number.

13. The method according to claim 12, wherein said second check element comprises said unique key assigned to the caller.

14. The method according to claim 13, wherein said first ciphering algorithm is a CAVE algorithm.

15. The method according to claim 14, wherein said second ciphering algorithm is a CAVE algorithm.

16. The method according to claim 15, wherein said cellular terminal comprises a cellular telephone and said cellular-phone-service-provider station comprises a mobile switching center.

17. The method according to claim 16, wherein said method is automatically initiated each time said cellular terminal is activated for use.

18. The method according to claim 17, wherein said telephone network comprises one of a PSTN-type network and an ISDN-type network.

* * * * *

UNITED STATES PATENT AND TRADEMARK OFFICE
CERTIFICATE OF CORRECTION

| | | |
|---|---|---|
| PATENT NO. | : 6,198,823 B1 | Page 1 of 1 |
| APPLICATION NO. | : 09/047040 | |
| DATED | : March 6, 2001 | |
| INVENTOR(S) | : Mills | |

It is certified that error appears in the above-identified patent and that said Letters Patent is hereby corrected as shown below:

On the Title Page:
    In the Abstract Item (57), line 3, please replace "this process" with -- this authentication process --;
    In the Abstract Item (57), line 17, please replace "transmit" with -- transmits --;
    In the Abstract Item (57), line 19, please replace "of CAVE" with -- of a CAVE --.

Signed and Sealed this
Seventeenth Day of May, 2011

David J. Kappos
*Director of the United States Patent and Trademark Office*